United States Patent [19]

De Munari

[11] 4,100,744

[45] Jul. 18, 1978

[54] INSTALLATION FOR THE PRODUCTION OF ENERGY WHICH UTILIZES A SOURCE OF HEAT OR NATURAL THERMIC DIFFERENCES IN LEVEL

[76] Inventor: Delio De Munari, Via Dante 13, Quinto Vicentino (Vicenza), Italy

[21] Appl. No.: 780,476

[22] Filed: Mar. 23, 1977

[30] Foreign Application Priority Data

Dec. 10, 1976 [IT] Italy .............................. 85622 A/76

[51] Int. Cl.² .............................................. F01K 25/10
[52] U.S. Cl. ........................................ 60/651; 60/671
[58] Field of Search ................ 60/643, 645, 641, 530, 60/531, 516, 517, 670, 671, 651, 690, 692; 165/45

[56] References Cited

U.S. PATENT DOCUMENTS

| | | | |
|---|---|---|---|
| 3,842,593 | 10/1974 | Bronicki | 60/671 |
| 3,932,995 | 1/1976 | Pecar | 60/676 |
| 4,006,595 | 2/1977 | Forbes | 60/516 |

*Primary Examiner*—Allen M. Ostrager
*Attorney, Agent, or Firm*—Bucknam and Archer

[57] ABSTRACT

An installation and a method for the production of energy which utilize a source of heat or natural thermic differences are described. A first container contains a fluid in the liquid state and is capable of transmitting the heat to the fluid, a second container being used for holding the fluid after completion of the thermodynamic cycle and after it has returned to the liquid state, the second container being at a temperature lower than the temperature which prevails in the first container. Conduit means for connecting the first and second container are provided. The fluid has a low boiling point and is capable of undergoing a change from the liquid to gaseous state. A turbine or equivalent device is provided to utilize the kinetic energy of the fluid and transform this energy into mechanical energy; the fluid is converted from the liquid to the gaseous state upon entry into this device and returns to the liquid state in the interior of the second container. The operation may be reversed with the second container being exposed to the source of heat.

9 Claims, 6 Drawing Figures

INSTALLATION FOR THE PRODUCTION OF ENERGY WHICH UTILIZES A SOURCE OF HEAT OR NATURAL THERMIC DIFFERENCES IN LEVEL

The present invention relates to the production of energy and more specifically to an installation for the production of mechanical energy, that is a form of energy which may be easily converted into electrical energy or other types of energy. As a source of heat the present invention utilizes natural sources of heat such as, for instance, solar energy, geothermal energy or similar energy. The invention may also utilize natural thermal differences due to differences in height such as the differences which exist between the bottom of the sea and the atmosphere above the surface of the sea or the differences in height which exist between lower layers of the earth and the atmosphere above the surface or similar differences.

It is well-known that due particularly to the fact that the traditional sources of energy and especially petroleum and uranium are diminishing, the search for alternative sources of energy has become increasingly pressing. The alternative sources should make it possible to avoid the destructive transformation of substances which are found on the earth and should utilize sources of heat which are practically unlimited such as the solar energy, the energy of oceans, geothermal energy and similar types of energy.

The utilization of these alternative energy sources, up to now, however, has been carried out with results which are hardly satisfactory because the object has always been to utilize thermodynamic cycles of different type, always in relation to gases or vapors, particularly water vapor, and the energy involved in the transformation from a physical state to another state has not been adequately utilized. Yet this energy of transformation due to a change of state may be achieved with great ease with substances which have a low boiling point and which are usually referred to as "low boilers".

An object of the invention is to provide an apparatus which permits to utilize rationally the energy produced in the transformations of substances of low boiling point from a physical state to another. The low boilers may be, for instance halogen-substituted organic substances, ammonia, carbon dioxide and other substances which are well-known and which have been utilized in the reverse cycle used in refrigeration. However, up to the present these substances have not been used for the utilization of alternative sources of energy or even if they have been used, they have given unsatisfactory results.

In its broad aspects the installation of the present invention comprises two containers of suitable dimensions, one of which contains the substance in the liquid state and which absorbs the energy in the form of heat from the alternative source of energy and transmits this energy to the liquid substance within the container. In this manner the liquid evaporates at a pressure which corresponds to the vapor pressure relative to the temperature to which the substance is heated. The second container is connected to the first one by means of a conduit which is provided with a check valve and a device for transforming fluid dynamic energy into mechanical energy, for instance a turbine or an equivalent device. The vapor which is produced by this turbine collects in the second container where it is converted again into liquid due to the low temperature at which the second container is kept. The valve may preferably have an adjustable opening.

It is essential for the proper functioning of the installation according to the present invention that the conduit take the liquid contained in the first container in the liquid state and that the transformation into the gaseous phase take place downstream of the valve and particularly that the transformation into the gaseous phase take place in the interior of the device which is used to produce mechanical energy, for instance the turbine.

The cycle ends when the entire portion of liquid contained in the first container has been transformed into vapor and then again into liquid in the second container or when the source of heat does not act any longer on the first container. The apparatus may be used to initiate a new cycle for introducing again liquid material in the first container or more simply by inverting the function of the two containers. This may be accomplished by a variety of different methods some of which will be discussed hereinbelow.

As it has been mentioned hereinabove the invention provides an installation which permits to utilize alternative sources of energy and which may be easily adapted to a multiplicity of environmental conditions. Further, the installation according to the invention, may be used with a multiplicity of liquids. There are, however, some fundamental requirements which must be complied with and which influence the proper thermodynamic efficiency. These requirements are:

a. The device which utilizes the energy must be immersed in the cold part of the installation or must be located as close as possible to the cold part of the installation and must be thermally insulated.

b. The fluid material which is being utilized must have a boiling point at one atmosphere lower than the minimum temperature of the cold source but sufficiently close to this minimum temperature.

c. At the critical temperature the vapor tension must be as high as possible.

d. The coefficient $Cp/Cv$, that is specific heat at constant pressure: specific heat at constant volume of the liquid which is being used must be as high as possible e. The heat of evaporation which is measured in K cal. per kilogram must be sufficiently high.

Obviously many embodiments of the invention are possible provided the fundamental requirements set forth hereinabove are compiled with. It is also manifest that the utilization of the installation according to the invention varies according to the conditions of the installation, according to the type of fluid being used as well as the several alternative sources of energy.

The drawings attached hereto serve the purpose of illustrating schematically different forms of the installation according to the present invention. By reference to the drawings, FIG. 1 represents schematically an installation with the inversion of the cycle by rotation of the system;

Figure 1:
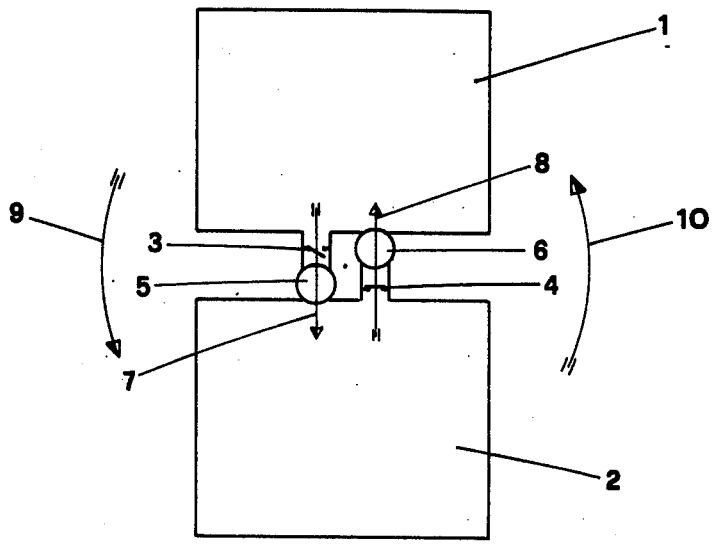

According to the first example of the installation shown in FIG. 1, two containers 1 and 2 are provided. The two containers are connected by two conduits for the fluid. Each conduit comprises a unidirectional valve which may preferably have an adjustable opening. Numerals 3 and 4 designate the valves. Each conduit is also provided with a turbine with a generator connected with it. The turbines are designated by numerals 5 and 6 respectively. The two conduits function alternatively corresponding to the inversion of the thermodynamic cycle respectively in the direction of work 7 or 8.

In actual operation, the fluid which is utilized in the liquid state, initially is entirely in the interior of container 1 and is at the start of a cycle of work. The liquid is subjected to heat from a source of heat, for instance solar energy, so that it is brought to temperature T1, with the vapor at the pressure corresponding to the vapor pressure of the fluid at that temperature. Container 2 is at a temperature T2 which is lower than the temperature T1 and also the pressure in container 2 is lower.

At the start of the first work cycle of the installation valve 3 is opened so that the liquid goes through the valve. The liquid enters turbine 5 and undergoes a change of state, that is it goes from the liquid phase to the gaseous phase by evaporation so that its internal energy is changed into mechanical energy. Obviously the mechanical energy may subsequently be transformed easily into other forms of energy, for instance electric energy or others according to the requirements.

The vapor which comes out from turbine 5 enters container 2 where it is condensed into a liquid phase due to the fact that the temperature T2 which prevails in this second container is lower than the transformation temperature of the fluid being used, at the pressure which prevails in container 2.

It should be noted that valve 3 advantageously is provided with means for adjusting the opening as a function of the difference of pressure which prevails between containers 1 and 2, so that a constant flow of the fluid is maintained within the same valve.

The cycle ends for instance when the pressures in the two containers reach equilibrium so that the flow of the fluid between the two containers ceases or when the action of the source of heat on the first container ceases.

At this point the installation is rotated either by manual means or by automatic means according to the direction shown by the arrows 9 towards 10 so that container 2 becomes subject to the source of heat instead of container 1. In this manner the cycle starts again and causes the vapor of the fluid within the container 2 to be under pressure up to the point when valve 4 is opened either manually or automatically so that the fluid enters turbine 6 where it is again transformed from the liquid state to the gaseous state and then it is discharged within the container 1 which this time is at the lower temperature. During this phase of the work valve 3 remains closed and turbine 5 does not function.

The cycles may follow one another automatically by suitable arrangements or suitable programming, responsive to variations in temperature and pressure in the two containers so that a completely automatic operation of the generators which are connected to the turbines is achieved. This operation is, of course, intermittent.

It should be noted that if the dimensions of the first container are such that a quantity of fluid placed therein, during the course for instance of a day absorbs the heat furnished during the hours when it is hot so that the installation functions during these hours, the inversion of the installation occurs during the night and a new cycle may be started the following day under better conditions.

Figure 2:
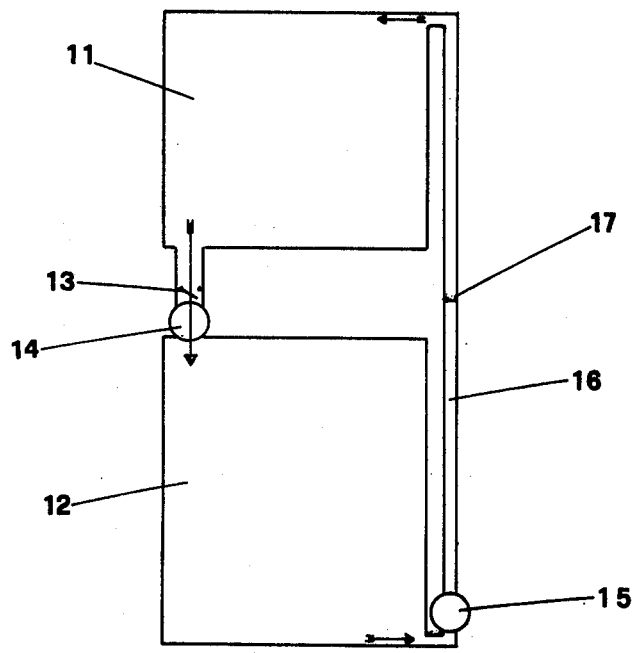
FIG. 2 represents schematically a second example of the installation with the recovery of the fluid by hydropneumatic means.

According to another embodiment of the invention shown in FIG. 2 the installation comprises a first container 11 of suitable dimensions which is exposed to the source of heat. The fluid of the type more suitable to the environment in which the installation is located is placed in this container and has a tendency to assume the pressure corresponding to its vapor pressure at that temperature. Numeral 12 designates the recovery container. This container 12 is connected to container 11 by means of a conduit which comprises the unidirectional check valve designated by numeral 13 which may have variable capacity. Numeral 14 designates the device which is used to utilize the energy, for instance a turbine or other equivalent device. The container used for the recovery of the fluid designated by numeral 12 is placed in a cold environment or it may simply be isolated thermically. This container is advantageously of dimensions greater than container 11.

The thermodynamic cycle occurs in the same manner as in the first example illustrated in FIG. 1 following the opening of valve 13 which is controlled either manually or automatically when the pressure in container 11 has reached the predetermined value so that mechanical energy is produced. This mechanical energy may be transformed into electric energy or any other type of energy in the device 14 in the interior of which the change of state of the fluid from the liquid state to the gaseous state occurs. The fluid returns to the liquid state in the interior of the reservoir used for the recovery designated by numeral 12.

At the end of the work cycle pump 15 which is placed in the conduit 16 causes the liquid to return to reservoir 11. Numeral 17 designates the check valve which is placed within the conduit 16. The liquid has returned to reservoir 11 which is ready for a new cycle.

The energy which is necessary for operation of the pump 15 is very small and may be supplied for instance by an accumulator battery which is charged during the cycle by the generator actuated by the device 14.

Figure 3:
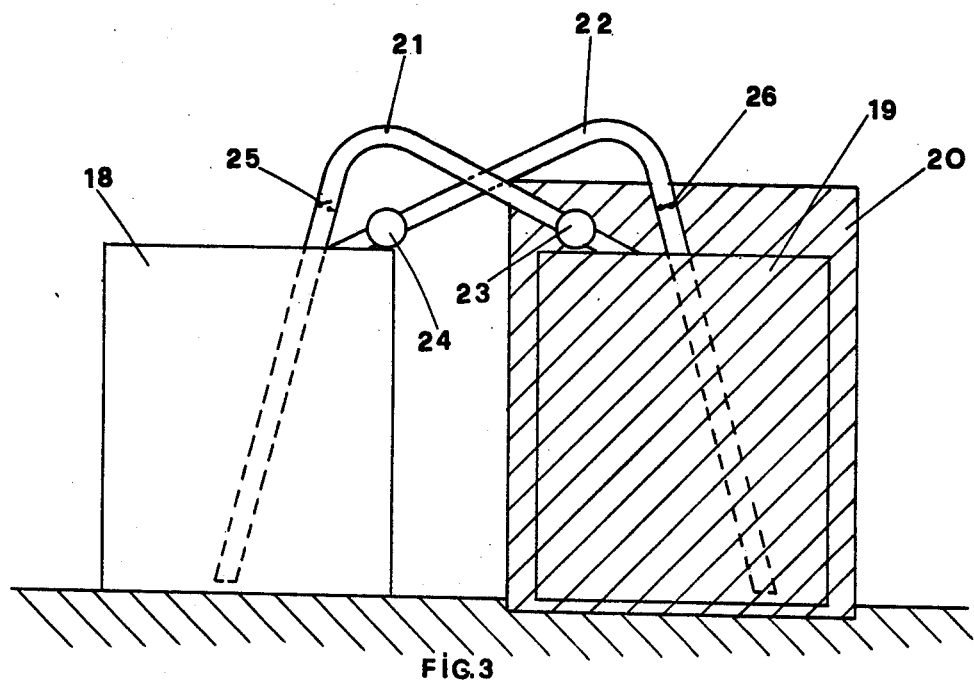
FIGS. 3 and 4 represent schematically with two different positions of work a third example of the installation in which the thermodynamic cycle is reversed by displacement of a movable anticalorific shield.
Figure 4:
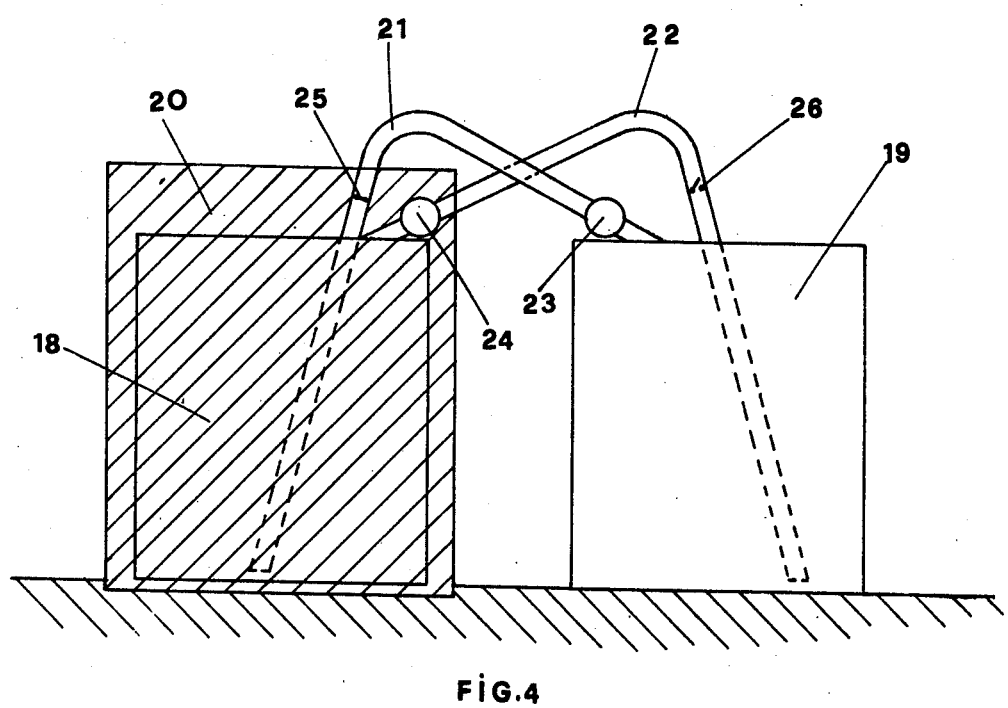

According to another embodiment of the invention illustrated in FIGS. 3 and 4 the installation comprises two containers 18 and 19, the first of which is exposed to the source of heat for instance solar energy in the first work cycle shown in FIG. 3 during which the second container is covered by panel 20. In the subsequent work cycle panel 20 is placed in position corresponding to container 18 so as to cover it so that the container 19 is exposed to the source of heat (FIG. 4).

The two containers 18 and 19 are connected by means of two conduits designated by numerals 21 and 22, each one of them being supplied with a device for the utilization of energy designated respectively by numerals 23 and 24 and also being provided with check valves designated respectively by numerals 25 and 26.

During the first work cycle of the installation shown in FIG. 3 conduit 21 takes the fluid in the liquid phase from the bottom of container 18 by means of valve 25 which is opened and which is controlled either manually or automatically when the pressure in the interior of container 18 has reached a predetermined value. The fluid goes through the device 23 which is used to utilize energy. There it undergoes a change of state from the liquid to the gaseous state and is discharged within the container 19 where it is reconverted into a liquid phase due to the lower temperature which prevails within the container 19.

After the first working cycle has ended, when all the liquid contained in container 18 or for instance a substantial part of it has been transferred into container 19, the shield 20 is transferred automatically to cover container 18 as shown in FIG. 4. In this manner container 18 is cooled and container 19 is exposed to the source of heat so that the temperature within container 19 rises until such a point that the fluid acquires the desired vapor pressure for the purpose of initiating a second work cycle in the installation.

This second work cycle starts with the opening of the valve 26 which causes the flow of the fluid in the liquid phase from the bottom of container 19 to container 18, going through the device 24 where the change of state of the fluid from the liquid to the gaseous state takes place while the liquid within the container 18 is converted into the liquid phase in view of the lower temperature which prevails within this container 18. In this manner the cycle repeats itself intermittently and the period depends upon the environmental conditions and the type of sources of heat being utilized; for instance in the cases in which solar energy is utilized, the period varies according to the climate and meteorological conditions.

Figure 5:
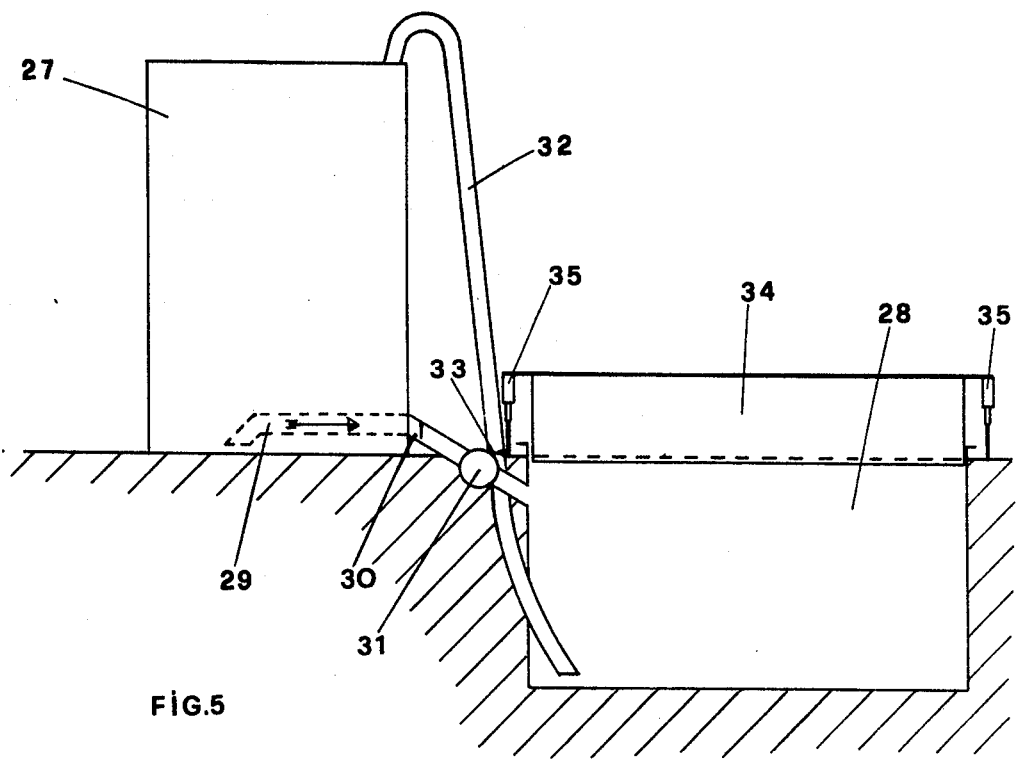
FIGS. 5 and 6 represent schematically in two different positions of work a third example of an installation with the natural restoration of the thermodynamic cycle by natural inversion of the temperature of the environment.
Figure 6:
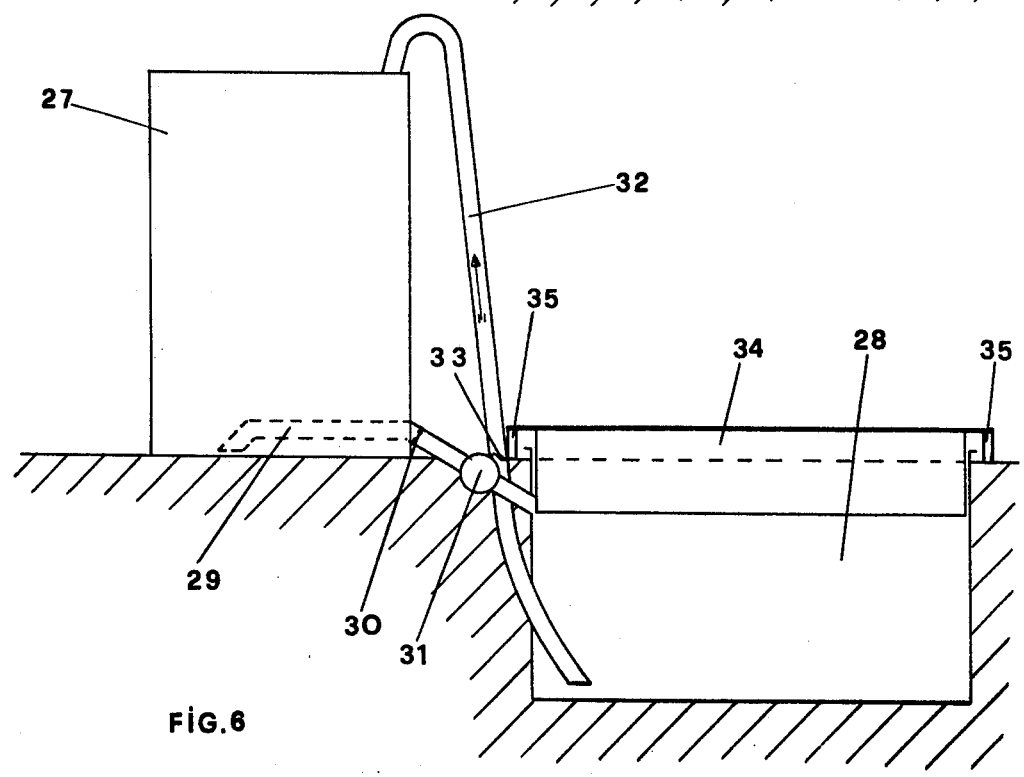

According to another embodiment of the invention illustrated in FIGS. 5 and 6 the installation comprises reservoir containers 27 and 28 the second of which is located at a level above ground level while the second is located below the ground level but close to the first one. The two containers are connected by means of conduit 29 which contains the check valve 30, the device 31 to utilize energy, and by means of conduit 32 which contains check valve 33.

This installation is particularly suitable for use in deserts and similar areas where during the day the temperature of the atmosphere is substantially higher than the temperature of the ground while during the night the contrary occurs. Under these conditions during the day the liquid which is contained in container 27 reaches substantial pressure due to the substantial heat of the atmosphere and initiates the cycle following the opening of valve 30, the flow of the liquid through conduit 29 and evaporation of the liquid within the device 31 which utilizes the energy. The latter discharges the vapor within the container 28 where the vapor is converted again into a liquid phase in view of the lower temperature which prevails within container 28. the latter is closed in the upper part by movable wall 34 which is maintained in a raised position by the hydraulic jacks 35 so that the fluid in the container 18 assumes its maximum volume due to expansion. At the end of the cycle, valve 30 is closed and the hydraulic jacks 35 are released so that the movable wall 34 is lowered under the effect of the force of gravity. This causes a substantial reduction of the volume of container 28 and corresponding increase of the pressure of the fluid in the interior of the same container. At this point valve 33 which is located in conduit 32 is opened while valve 30 is closed. As a result, the liquid reenters container 27 so that the latter is ready to start a new cycle obviously during the hours of the subsequent day.

The installation which has been illustrated schematically hereinabove in the accompanying drawings offers many forms of operation provided that the essential requirements mentioned hereinabove are complied with. On the other hand, it is clear that it is not necessary to describe technical details of the construction of the containers, the valves, the devices which are being used to convert the kinetic energy of the fluid into mechanical energy and all the other pieces of equipment and accessories which are obviously necessary in every installation because they are conventional and obviously unless they are considered together with the present installation, they do not fall within the scope of the invention.

I claim:

1. An installation for the production of energy of the type which utilizes a source of heat or natural thermic differences which comprises two containers of suitable dimensions, the first container containing a fluid in the liquid state and being capable of transmitting the heat to said fluid, the second container being used for holding the fluid after completion of the thermodynamic cycle and after it has returned to the liquid state, a cooling source for cooling said second container, said second container being at a temperature and at a pressure lower than the temperature and the pressure which prevail in said first container, conduit means for connecting said first and second container, said fluid having a boiling point at one atmosphere lower than the minimum temperature of the cooling source in the location of the installation, said fluid being capable of undergoing a change from the liquid to gaseous state, and a device capable of utilizing the kinetic energy of the fluid and transforming said energy into mechanical energy, said device being placed in the conduit means between the first and the second container, said fluid being converted from the liquid to the gaseous state upon entry in said device and returning to the liquid state in the interior of said second container.

2. The installation according to claim 1 which comprises valve means within said conduit means, said valve means being opened to let the fluid flow from said container into said device where the fluid changes from the liquid state to the gaseous state, and being discharged in the second container which is kept at a lower temperature, said fluid returning to the liquid state in said second container.

3. The installation according to claim 2 wherein the valve means have adjustable opening so that the flow of fluid within the device which utilizes the kinetic energy of the fluid is maintained constant during the entire work cycle of the fluid.

4. An installation for the production of energy according to claim 1, which comprises means for reversing the installation at the end of a work cycle whereby the second container is subjected to the action of a source of heat and the first container is brought at the lower temperature at which the cycle occurs.

5. An installation according to claim 1 wherein a conduit connects said containers, said conduit being provided with a check valve and a pump manipulated by external means whereby the fluid which is in the liquid state in said second container is reintroduced in said first container at the end of a work cycle.

6. An installation according to claim 1 which comprises a movable shield which is capable of being alternatively placed upon said second or said first container during each work cycle to expose alternatively only said first container or only said second container to the source of heat.

7. An installation for the production of energy according to claim 1 which comprises two containers, the first of said containers being placed above ground level and being subjected to a source of heat, the second container being placed under the ground level and being provided with an upper movable wall, first and second conduit means between said first and said second container, valve means within said conduits, means for raising said upper wall and for maintaining said upper wall in raised position whereby the fluid in the liquid state which has been transferred from the first container assumes the maximum volume in said second container, means for lowering said upper wall and for decreasing the volume of said second container and for increasing the pressure of the fluid therein, means for opening said valve means in said second conduit means and for reintroducing said fluid into said first container.

8. A method for utilizing a source of heat for the production of energy which comprises heating a low boiling liquid substance in a first zone which is exposed to the action of said source of heat; removing said liquid substance from said first zone and then converting said liquid substance into the gaseous form whereby the kinetic energy of the liquid substance is converted into mechanical energy, transferring said substance in the gaseous form into a second zone which is kept at a lower temperature whereby the substance is converted into the liquid form, said low boiling substance having a boiling point at one atmosphere lower than the minimum temperature in the location in which the source of heat is utilized and continuing the flow of the substance until the end of the work cycle.

9. The method according to claim 8 wherein the liquid substance in said second zone is exposed to the action of said source of heat, at the end of one work cycle and the cycle is reversed with said substance flowing from said second container to said first container.

* * * * *